(12) United States Patent
Kuroe et al.

(10) Patent No.: US 6,590,740 B2
(45) Date of Patent: Jul. 8, 2003

(54) SHIELDED MAGNETIC HEAD AND MAGNETIC REPRODUCING APPARATUS

(75) Inventors: Akio Kuroe, Osaka (JP); Akio Murata, Osaka (JP); Sayuri Muramatsu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 156 days.

(21) Appl. No.: 09/917,434

(22) Filed: Jul. 27, 2001

(65) Prior Publication Data

US 2002/0018316 A1 Feb. 14, 2002

(30) Foreign Application Priority Data

Aug. 7, 2000 (JP) ........................................ 2000-238630

(51) Int. Cl.[7] ........................... G11B 5/127; G01R 33/00
(52) U.S. Cl. ..................................... 360/110; 360/111
(58) Field of Search ................................ 360/110, 111, 360/119, 125, 126, 127, 319, 321; 324/249, 260

(56) References Cited

U.S. PATENT DOCUMENTS 4,525,668 A * 6/1985 Lienhard et al. ............ 324/142

5,821,432 A * 10/1998 Sidler et al. ............ 73/862.043

FOREIGN PATENT DOCUMENTS

| EP | 573372 A2 * 12/1993 | ........... G01R/33/06 |
| EP | 965851 A2 * 12/1999 | ........... G01R/33/02 |
| EP | 1041391 A2 * 10/2000 | ........... G01R/33/09 |

OTHER PUBLICATIONS

The Technical Report of IEICE MR95–80, Jan. 1996.

* cited by examiner

*Primary Examiner*—William Klimowicz
(74) *Attorney, Agent, or Firm*—Merchant & Gould P.C.

(57) ABSTRACT

A shielded magnetic head includes a magnetically shielded gap and first to fourth conductive magnetic films disposed in the gap. The first to fourth conductive magnetic films, each extending parallel to a tip face of a magnetic head to be opposed to a magnetic recording medium, are aligned at a distance from one another in a direction perpendicular to the tip face so as to be away from the tip face in ascending order and connected to one another so as to form a bridge circuit. The distance between the first conductive magnetic film and the tip face is set so that a signal magnetic field from the magnetic recording medium is applied to the first conductive magnetic film. By canceling impedance components that do not vary depending on a magnetic field, the shielded magnetic head detects only impedance components that vary depending on a signal magnetic field.

9 Claims, 6 Drawing Sheets

SHIELDED MAGNETIC HEAD AND MAGNETIC REPRODUCING APPARATUS

BACKGROUND OF THE INVENTION

1. Field of the Invention

The present invention relates to a shielded magnetic head of an active system with high sensitivity and a high-density magnetic reproducing apparatus utilizing variations in high-frequency impedance.

2. Related Background Art

Figure 6:
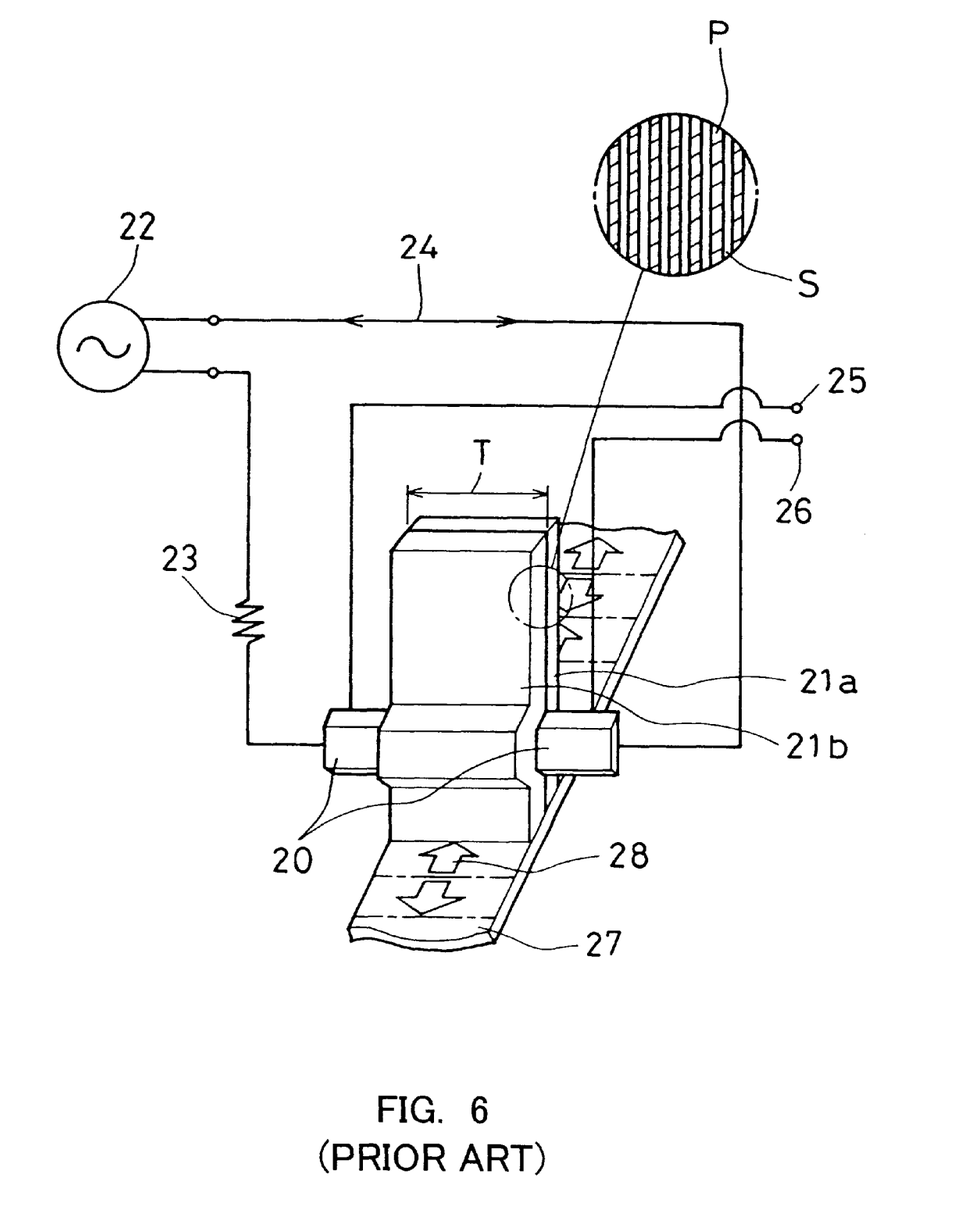
FIG. 6 is a perspective view showing an operating principle of a conventional MI head.

FIG. 6 shows the operating principle of an MI (magneto-impedance) head described in The Technical Report MR95-80 published by The Institute of Electronics, Information and Communication Engineers. The MI head employs a magnetic impedance element utilizing variations in magnetic impedance. In FIG. 6, a detecting conductor 20 formed of a conductive metallic thin film is interposed across a track width T between soft-magnetic cores 21a and 21b. The soft-magnetic cores 21a and 21b are formed of a laminated film of a permalloy film P and a $SiO_2$ film S. A high-frequency signal is applied from a high-frequency oscillator 22 for the UHF band via a resistor 23 so that the detecting conductor 20 is fed with a current 24. Terminals 25 and 26 are disposed at opposite ends of the detecting conductor 20, respectively. Therefore, variations in magnetic impedance between the terminals 25 and 26 are detected as variations in voltage between the terminals 25 and 26.

When there is no signal magnetic field generated from magnetization 28 on a magnetic recording medium 27, only a voltage according to a UHF carrier signal is generated between the terminals 25 and 26. The voltage corresponds to the product of impedance between the terminals 25 and 26 of the detecting conductor 20 and the current 24. When a signal magnetic field from the magnetic recording medium is applied, since an easy axis direction of the soft-magnetic cores 21a and 21b is oriented in a track width direction, the magnetization is tilted from the original orientation direction by the signal magnetic field to reduce magnetic impedance. Hence, a UHF carrier signal is detected in its amplitude-modulated state by the signal magnetic field of the magnetic recording medium. By amplitude-demodulating this signal, the signal magnetization 28 on the magnetic recording medium 27 can be read.

Figure 7:
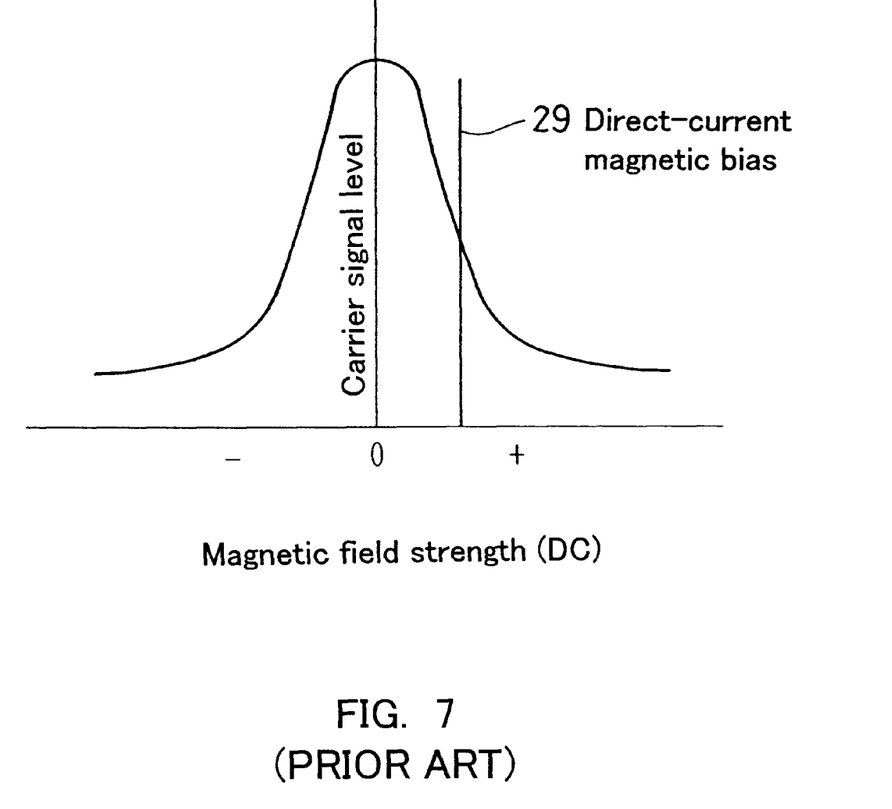
FIG. 7 is a graph showing an operation of the MI head shown in FIG. 6.

Realization of this head holds the potential of obtaining an output about ten times that of a giant MR (magnetoresistive) head. FIG. 7 is a graph showing an operating curve of the element shown in FIG. 6. This operating curve was obtained by setting a carrier signal frequency to 1.0 GHz, placing the above-described element in a central portion of a Helmholtz coil, and applying a dc magnetic field to the element. As seen from FIG. 7, in order to reproduce signals with good sensitivity and obtain waveforms with reduced distortion, a direct-current magnetic bias 29 needs to be set. In the above-described model, a direct current field is generated by the Helmholtz coil and used as a bias.

This method, however, has been disadvantageous with respect to the following points: reduction in dimension of the detecting conductor 20, particularly, in cross-sectional area, considerably increases a value of resistance; and reduction in thickness of the soft-magnetic cores 21a and 21b around the detecting conductor 20 reduces inductance, namely, impedance. Moreover, in order to improve track recording density, it has been requested that a detecting part be positioned closely to the magnetic recording medium 27, and that a shielded magnetic head configuration can be applied where a strong signal magnetic field from a medium is detected.

Thus, a magnetic head with high sensitivity that allows high-density recording has been requested. The achievement of this requires the development of a new detecting method utilizing variations in impedance at a high frequency and the clarification of the operating characteristics of the method.

SUMMARY OF THE INVENTION

It is an object of the present invention to provide a shielded magnetic head with excellent resolution and high sensitivity that can detect, by utilizing variations in impedance at a high frequency, only an impedance component that varies depending on a signal magnetic field.

In order to solve the afore-mentioned problems, a shielded magnetic bead of the present invention includes a magnetically shielded gap and first to fourth conductive magnetic films disposed in the gap. The first to fourth conductive magnetic films, each extending parallel to a tip face of the magnetic head to be opposed to a magnetic recording medium, are aligned at a distance from one another in a direction perpendicular to the tip face so as to be away from the tip face in ascending order and connected to one another so as to form a bridge circuit. The distance between the first conductive magnetic film and the tip face is set so that a signal magnetic field from the magnetic recording medium is applied to the first conductive magnetic film.

In this magnetic head, preferably, the distance between the respective conductive magnetic films is set so that a signal magnetic field from the magnetic recording medium is applied substantially only to the first conductive magnetic film.

The above-described magnetic head preferably includes: a pair of shielding soft-magnetic materials on opposite sides of the gap; means for applying a direct current field to the first to fourth conductive magnetic films; first and second electrode terminals for feeding a high-frequency carrier signal to the bridge circuit; third and fourth electrode terminals for detecting the bridge output of the bridge circuit; a high-frequency oscillator connected to the first and second electrode terminals, which outputs the high-frequency carrier signal; and a high-frequency amplifier connected to the third and fourth electrode terminals. Variations in impedance of the first conductive magnetic film depending on a signal magnetic field from the magnetic recording medium are detected as variations in the high-frequency carrier signal.

It is preferable that effective permeability of the shielding soft-magnetic materials at a frequency of the high-frequency carrier signal be smaller than that of the conductive magnetic films. Further preferably, the conductive magnetic films have a thickness equal to or less than skin depth at a frequency of the high-frequency carrier signal.

Furthermore, it is preferable that the respective shielding soft-magnetic materials include a first magnetic material disposed on a face opposed to the conductive magnetic films and having excellent high-frequency characteristics and a second magnetic material disposed on an outer side of the first magnetic material, which responds to a signal applied from a magnetic recording medium.

Moreover, preferably, a high-frequency carrier signal current with a direct current for a direct-current magnetic bias being superimposed is applied to the conductive magnetic film. As an alternative, a permanent magnet may be provided for applying a direct-current bias magnetic field in a direction perpendicular to the tip face to the first to fourth conductive magnetic films.

A magnetic reproducing apparatus of the present invention includes: a shielded magnetic head configured according to any one of the above-described configurations; a retention member for retaining a recording medium on which signals are recorded magnetically; and a positioning member for positioning the shielded magnetic head at a predetermined position with respect to the recording medium.

DETAILED DESCRIPTION OF THE INVENTION

Hereinafter, the present invention will be described in detail by way of embodiments with reference to FIGS. 1 to 5. Description is directed first to a principle of the present invention. It is known in the field of electromagnetism that inductance is determined by the number of times magnetic flux generated by a current flowing in a conductor crosses the current. The inductance thus determined can be categorized as inner inductance and outer inductance. The inner inductance is the inductance determined by a current in the conductor and magnetic flux generated inside the conductor. The outer inductance is the inductance determined by a current flowing inside the conductor and magnetic flux generated outside the conductor. The following can be regarded as examples of the outer inductance: the inductance in a situation where a non-magnetic lead wire is wound around a magnetic material; and the inductance in a situation where a soft-magnetic material is disposed around a non-magnetic conductor.

In the meanwhile, signal detecting methods in a conventional magnetic head include: a method utilizing variations in resistance such as MR and GMR; a method such as the MI effect utilizing an eddy current to detect a signal according to variations in resistance in skin depth varying in response to a magnetic field; or a method in the conventional technique described above, that employs a configuration in which a detecting conductor is interposed between soft-magnetic cores to detect outer impedance variance depending on a signal magnetic field.

A detecting method of the present invention is intended mainly to detect, by interposing a ribbon-shaped conductive magnetic film of a magnetic material between shielding cores, variations in inner inductance of the conductive magnetic film depending on a signal magnetic field. In addition to this, when outer impedance is combined by forming second magnetic films on the surfaces of the shielding cores, variations in inner and outer impedance can be used as a signal detecting method.

Generally, it is well-known that in a conductive metallic film, a resistance component increases with decreasing thickness of the film. In using the MI effect by making a current flow through soft-magnetic materials, it is required to use the size of skin depth that is generated by an eddy current. Because of this, the soft-magnetic materials need to be considerably thicker in dimension than the skin depth. Therefore, the incorporation of the soft-magnetic materials into a magnetic head involves dimensional limitations. Also, in the conventional case utilizing outer impedance by forming a soft-magnetic film around a conductive metallic film, it has been revealed that a resistance component is related to the cross-sectional area of the conductive film that penetrates a magnetic circuit, and that particularly, a reduction in the cross-sectional area of a metallic conductor considerably increases a resistance component which does not vary depending on a magnetic field, whereby variations in impedance depending on a signal magnetic field are substantially masked.

Accordingly, it is preferable to detect only the varying impedance components by canceling excessively increased resistance components. In the present invention, a plurality of conductive magnetic films disposed between shielding cores of a shielded magnetic head constitute a Wheatstone bridge circuit. This makes it possible to cancel the resistance components that increase substantially due to the thinning of a soft-magnetic film so that only impedance components that vary depending on a signal magnetic field are obtained.

In the present invention, a conductive magnetic film is interposed, for example, in a narrow gap of 0.1 $\mu$m or less to constitute a shielded magnetic head. Accordingly, the conductive magnetic film may be made extremely thin with a thickness of 500 Å or less. This leads to a substantial increase in a resistance component that does not vary.

There has been no magnetic head employing the detecting method utilizing inner inductance as described above, that is, the detecting method in which a thin film having such a thickness that it is impossible for skin depth to be generated by an eddy current, may be used. According to the method, the thin film is directly fed with a high-frequency current, so that signal detection is performed using variations in the inner inductance caused by permeability variations depending on the applied magnetic field.

The magnetic head of the present invention has a similar configuration to that of MR or GMR. In MR or GMR, however, a direct current is applied to utilize resistance variations depending on a magnetic field. On the other hand, the magnetic head of the present invention is different in that it is constructed so as to be applied with a high-frequency carrier signal and resistance components increasing with the thinning of the conductive magnetic thin film are canceled with the use of four conductive magnetic thin films. The "high-frequency" means the frequency of 1 GHz or more in terms of the magnetic reproducing function according to the present invention. The magnetic head of the present invention can possess further advantage that finer characteristics can be obtained by forming second magnetic material layers on the conductive magnetic films or shielding soft-magnetic materials and making high-frequency permeability of the second magnetic material layers different from that of the shielding soft-magnetic materials. On the other hand, in a conventional MR or GMR head, even though it appears to have the similar configuration to that of the present invention, feeding a conductive thin film with a high-frequency current alone does not yield a desired output since high-frequency impedance is masked by increased resistance components.

Embodiment 1

Figure 1:
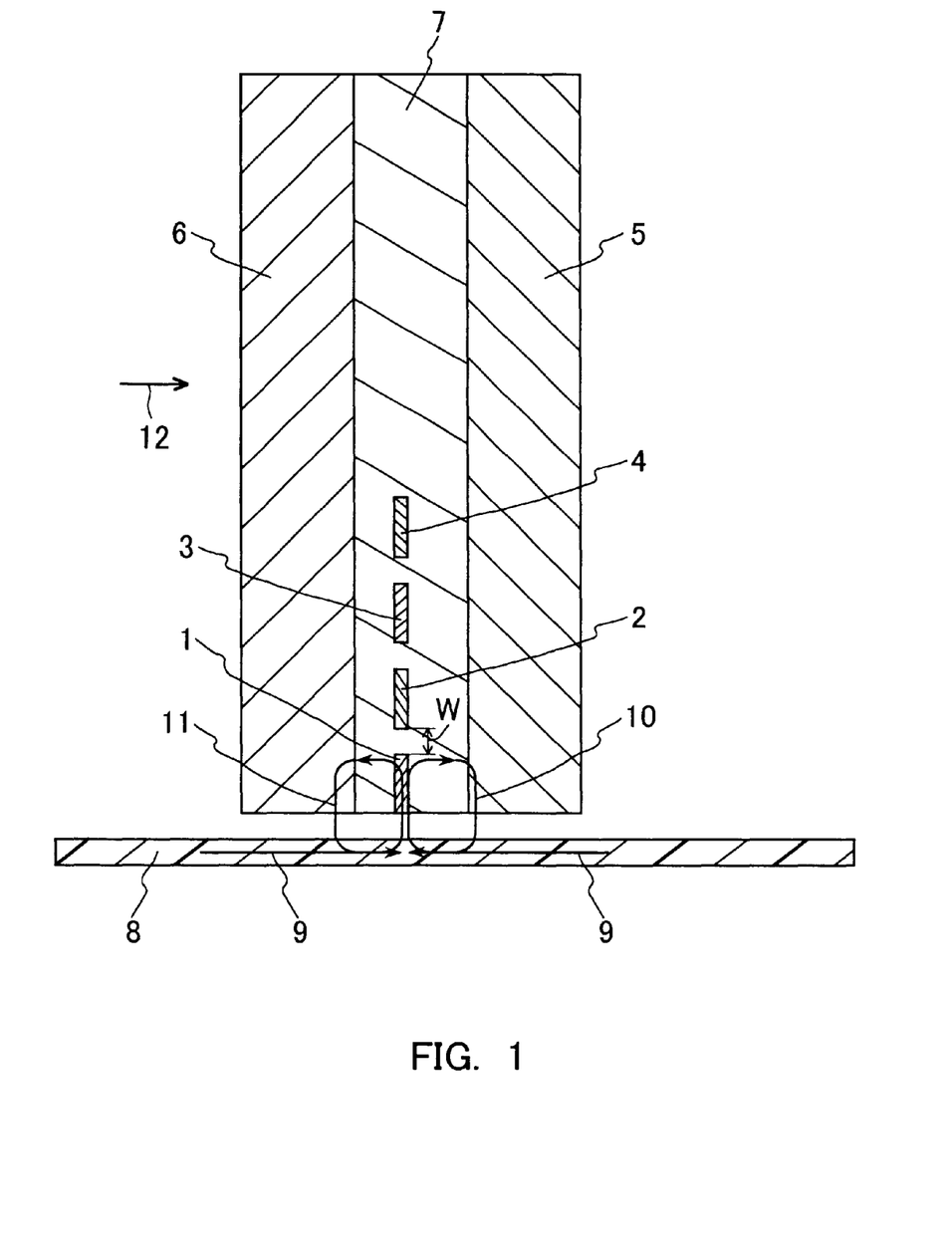
FIG. 1 is a cross-sectional view of a magnetic head according to Embodiment 1 of the present invention.
Figure 2:
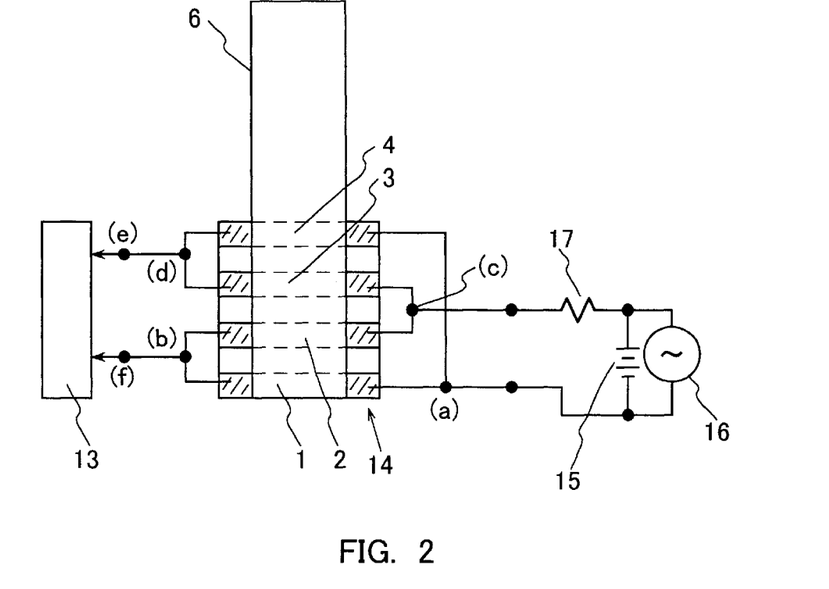
FIG. 2 is a side view of the magnetic head shown in FIG. 1.

FIGS. 1 and 2 are a sectional front view and a side view, respectively, showing a magnetic head in Embodiment 1. In FIG. 1, reference numerals 5 and 6 denote shielding cores, each of which may be formed of a laminated film of CoNbZr and $SiO_2$. Between the shielding cores 5 and 6, a gap 7 of an insulating material that may be composed of $SiO_2$ is formed. In the gap 7, four conductive magnetic films are disposed, including first to fourth conductive magnetic films 1 to 4, which may be formed of FeTaN films. This magnetic head is opposed to a magnetic recording medium 8 as shown in the figure.

FIG. 2 shows a side view of a magnetic head 14 seen in a direction indicated by an arrow 12 in FIG. 1. The first to fourth conductive magnetic films 1, 2, 3, and 4 are connected so as to constitute a bridge circuit. The output of the bridge circuit is applied to a high-frequency amplifier 13. Further, a direct-current magnetic bias current from a direct-current power source 15 and a high-frequency carrier signal current from a high-frequency oscillator 16 are superimposed and applied to the bridge circuit via a resistor 17.

As means for applying a direct-current magnetic bias, the use of a permanent magnet such as Co—Pt in place of a direct-current magnetic bias current also is effective. In that case, the permanent magnet applies a magnetic field in a direction perpendicular to a face of the magnetic recording medium 8 to the first to fourth conductive magnetic films 1 to 4.

In a magnetic head configured as above, when the magnetic head and the magnetic recording medium 8 relatively moves facing each other as shown in FIG. 1, magnetic fluxes 10 and 11 from signal magnetization 9 of the magnetic recording medium 8 pass through the first conductive magnetic film 1 and the shielding cores 5 and 6. The magnetic head in this case can be designed such that by forming a sufficient space as a space w between the first conductive magnetic film 1 and the second conductive magnetic film 2, the magnetic fluxes 10 and 11 do not pass through the second, third, and fourth conductive magnetic films 2, 3, and 4.

Figure 3:
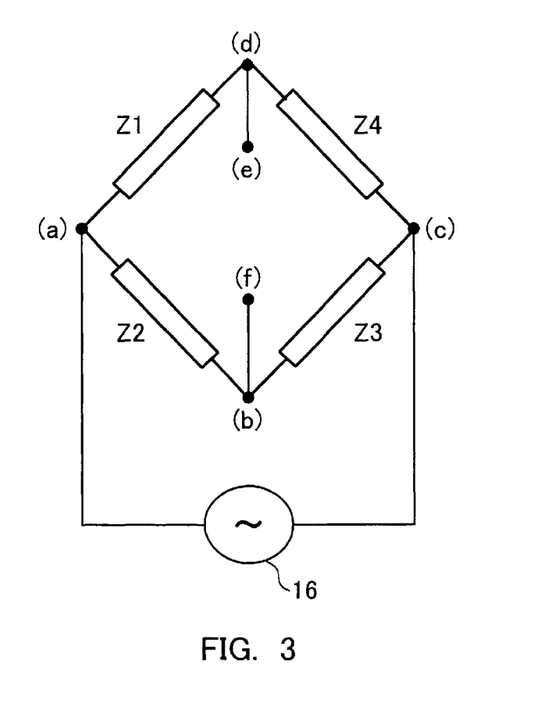
FIG. 3 is a diagram showing a bridge circuit corresponding to the configuration of the magnetic head shown in FIG. 1.

FIG. 3 is a circuit diagram showing a Wheatstone bridge circuit composed of the first to fourth conductive magnetic films 1 to 4 as shown in FIG. 2. Impedances Z1, Z2, Z3, and Z4 correspond to the first to fourth conductive magnetic films 1 to 4. Between contact points (a) and (c), a high-frequency signal is applied from the high-frequency signal oscillator 16. The output of the bridge circuit is detected between contact points (b) and (d). When the impedances Z1, Z2, Z3, and Z4 are equal, no voltage is generated between the contact points (b) and (d). It is desirable that the conductive magnetic films 1, 2, 3, and 4 be aligned equidistantly in the gap. This allows boundary conditions with respect to a carrier in the GHz band to be the same, and thus the impedances Z1, Z2, Z3, and Z4 are likely to be equal.

In the shielded magnetic head 14 configured as described above, when there is no signal magnetic field from the magnetic recording medium 8, the first to fourth conductive magnetic films 1 to 4 have equal impedance, so that no output voltage is generated between electrode terminals (e) and (f) connected respectively to the contact points (b) and (d) of the bridge circuit. When a signal magnetic field is applied from the magnetic recording medium 8, the signal magnetic fluxes 10 and 11 from the magnetic recording medium 8 flow only in the first conductive magnetic film 1. As a result, only the impedance Z1 of the first conductive magnetic film 1 varies. In the output of the bridge circuit in that case, impedance components that do not vary depending on a magnetic field are canceled. Consequently, only impedance components that varied depending on a signal magnetic field are detected as an output of the bridge circuit between the electrode terminals (e) and (f). The signal thus obtained is amplified by the high-frequency amplifier 13.

Figure 4:
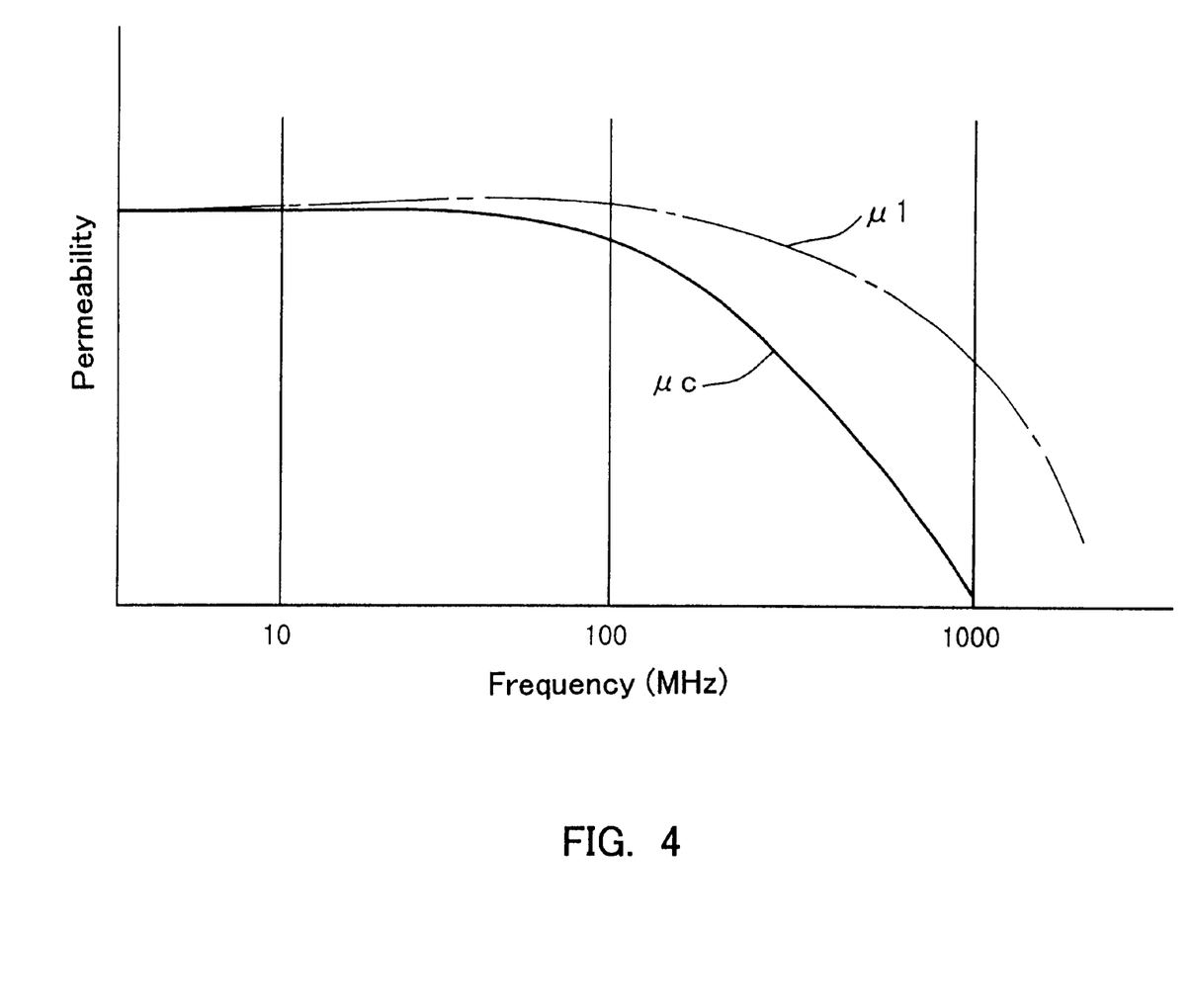
FIG. 4 is a graph showing permeability characteristics of a magnetic material used in the magnetic head according to Embodiment 1.

The contact points (a), (b), (c), and (d) should be formed as thick as possible by a film of materials having excellent conductivity such as Cu, Al, Au, or Ag. This allows a bridge circuit with excellent accuracy to be formed. Further, a frequency characteristic of effective permeability of the materials of the first to fourth conductive magnetic films 1 to 4 and the shielding cores 5 and 6 should be set as shown in FIG. 4. That is, at a high-frequency carrier signal frequency of 1 GHz, a value of effective permeability $\mu 1$ of the first to fourth conductive magnetic films 1 to 4 should be larger than that of effective permeability $\mu c$ of the shielding cores 5 and 6. This allows areas for responding to a high-frequency carrier signal and a signal component from the magnetic recording medium to be assigned respectively to the conductive magnetic films and the shielding cores.

As a conductive magnetic film, all kinds of soft-magnetic materials including NiFe, the FeCo family, and the FeN family, as well as a FeTaN film, are effective.

Embodiment 2

Figure 5:
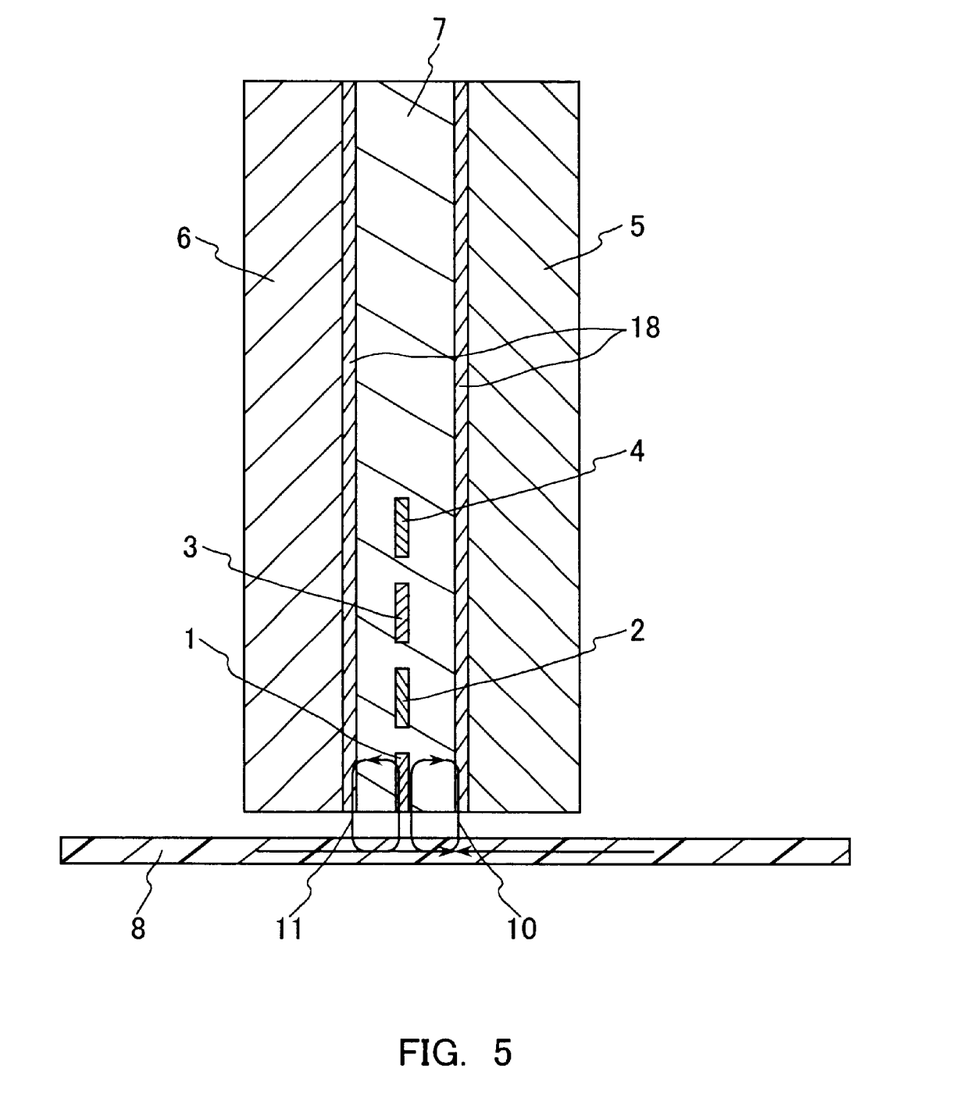
FIG. 5 is a cross-sectional view of a magnetic head according to Embodiment 2.

FIG. 5 is a cross-sectional view of a shielded magnetic head according to Embodiment 2. In this embodiment, the operating principle of the magnetic head is identical to that of Embodiment 1, and therefore, its detailed description is not repeated. The difference between this embodiment and Embodiment 1 is that second soft-magnetic films 18 with a permeability that responds to a carrier signal frequency are provided on the faces of the shielding cores 5 and 6 on a side of the gap 7.

According to this configuration, signal magnetic flux applied from the magnetic recording medium 8 passes through the second soft-magnetic films 18. This leads to the generation of outer impedance with the effect of increasing impedance for each conductive magnetic film. The increased impedance results in an increase in voltage variance depending on a signal magnetic field.

As the second soft-magnetic films 18, all kinds of soft-magnetic materials including NiFe, the FeCo family, and the FeN family, as well as FeTaN used for the four conductive magnetic films, are effective.

The shielded magnetic heads according to the above-mentioned embodiments can be incorporated into a magnetic reproducing apparatus having a conventional ordinary construction. That is, the apparatus may include a retention member for retaining a recording medium on which signals are recorded and a positioning member for positioning the magnetic head at a predetermined position with respect to the recording medium.

Although in Embodiments 1 and 2, an FeTaN film was used as a conductive magnetic thin film, magnetic materials with reduced specific resistance such as a permalloy are more suitable. An FeTaN film has a specific resistance of 75 $\mu\Omega\cdot$cm, while a permalloy film has a specific resistance of 20 $\mu\Omega\cdot$cm. With the use of a permalloy film, the resistance in the case of a film of 500 Å in thickness, 0.5 $\mu$m in length, and 0.5 $\mu$m in width, for example, can be reduced from about 15 $\Omega$ in the case of an FeTaN film to about 4 $\Omega$. When the resistance value to be canceled is considerably large with respect to impedance variance depending on a magnetic field, errors of cancellation become considerable. The errors can be reduced by selecting a material with reduced specific resistance.

Furthermore, although as a dielectric forming a gap $SiO_2$ was used in the above embodiments, inorganic dielectric films such as alumina and glass also are effective. Further, although as a shielding soft-magnetic film a laminated film of a CoZrNb metallic magnetic material and $SiO_2$ was used in order to suppress an eddy current, other metallic magnetic materials such as the Fe-family and Co-family metallic magnetic materials or a ferrite oxide also are effective.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A shielded magnetic head comprising a magnetically shielded gap and first to fourth conductive magnetic films disposed in the gap, wherein the first to fourth conductive magnetic films, each extending parallel to a tip face of the magnetic head to be opposed to a magnetic recording medium, are aligned at a distance from one another in a direction perpendicular to the tip face so as to be away from the tip face in ascending order and connected to one another so as to form a bridge circuit, and wherein the distance between the first conductive magnetic film and the tip face is set so that a signal magnetic field from the magnetic recording medium is applied to the first conductive magnetic film.

2. The shielded magnetic head according to claim 1, wherein the distance between the respective conductive magnetic films is set so that a signal magnetic field from the magnetic recording medium is applied substantially only to the first conductive magnetic film.

3. The shielded magnetic head according to claim 1, comprising:

a pair of shielding soft-magnetic materials on opposite sides of the gap;

a unit for applying a direct current field to the first to fourth conductive magnetic films;

first and second electrode terminals for feeding a high-frequency carrier signal to the bridge circuit;

third and fourth electrode terminals for detecting a bridge output of the bridge circuit;

a high-frequency oscillator connected to the first and second electrode terminals, which outputs the high-frequency carrier signal; and a high-frequency amplifier connected to the third and fourth electrode terminals, wherein variations in impedance of the first conductive magnetic film depending on a signal magnetic field from the magnetic recording medium are detected as variations in the high-frequency carrier signal.

4. The shielded magnetic head according to claim 3, wherein effective permeability of the shielding soft-magnetic materials at a frequency of the high-frequency carrier signal is smaller than that of the conductive magnetic films.

5. The shielded magnetic head according to claim 3, wherein the conductive magnetic films have a thickness equal to or less than skin depth at a frequency of the high-frequency carrier signal.

6. The shielded magnetic head according to claim 3, wherein a high-frequency carrier signal current with a direct current for a direct-current magnetic bias being superimposed is applied to the conductive magnetic film.

7. The shielded magnetic head according to claim 3, having a permanent magnet applying a direct-current bias magnetic field in a direction perpendicular to the tip face to the first to fourth conductive magnetic films.

8. The shielded magnetic head according to claim 1, further comprising:

a first magnetic material disposed on a face opposed to the conductive magnetic films and having excellent high-frequency characteristics; and a second magnetic material disposed on an outer side of the first magnetic material, which responds to a signal applied from a magnetic recording medium.

9. A magnetic reproducing apparatus comprising:

a shielded magnetic head according to claim 1;

a retention member for retaining a recording medium on which signals are recorded magnetically; and a positioning member for positioning the magnetic head at a predetermined position with respect to the recording medium.

* * * * *